United States Patent Office 3,014,909
Patented Dec. 26, 1961

3,014,909
NEW BASICALLY SUBSTITUTED 6-METHYL-ERGOLENE DERIVATIVES
Jürg Rutschmann, Oberwil, Basel-Land, and Emil Schreier, Basel, Switzerland, assignors to Sandoz Ltd., Basel, Switzerland
No Drawing. Filed Sept. 9, 1959, Ser. No. 838,838
Claims priority, application Switzerland Sept. 26, 1958
10 Claims. (Cl. 260—285.5)

The present invention relates to basically substituted 6-methyl-ergolene derivatives, new compounds having the general Formula I

(I)

wherein R is a 6-methyl-ergolene(8)yl(8)- or a 6-methyl-ergolene(9)yl(8)- or a 6-methyl-isoergolene(9)yl(8) radical, the salts thereof and the quaternary derivatives thereof. It also relates to processes for their production.

The present invention thus provides, as new industrial materials, the compounds having the general Formula I above, their salts and their quaternary derivatives.

In accordance with the process of the invention the compounds having the Formula I are produced by converting elymoclavine having the Formula II

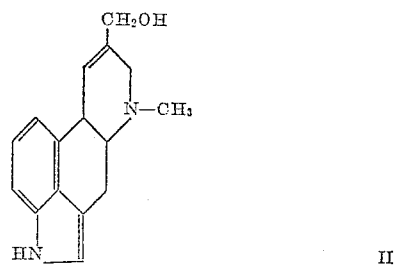
II to give a pyridinium salt having the general Formula IV

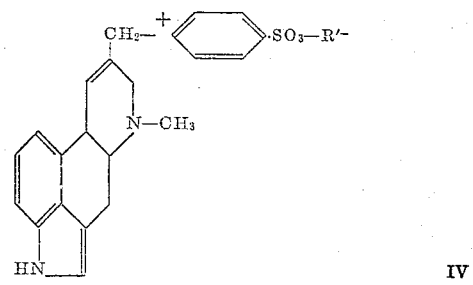
IV wherein R' has the significance given hereinafter, by treatment with an alkyl-, aryl-, or alkaryl-sulphonic acid chloride having the general Formula III $$R'-SO_2Cl \quad III$$

wherein R' is an aliphatic, aromatic or alkylaromatic radical, said compound is hydrogenated to give the corresponding 6-methyl-ergolene(8) derivative having the general Formula V,

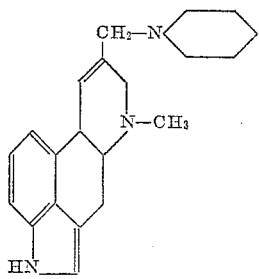
V either directly or by exchange of the alkyl-, aryl-, or alkaryl-sulphonic acid ion with another anion, for example $OH^-$, $Cl^-$, $Br^-$, $ClO_4^-$, $[SO_4]_{1/2}^-$, and optionally converting the resulting compound having the Formula V by treatment with a strong base to give the isomeric 6-methyl-ergolene(9)- derivative and/or converting into the corresponding salt or quaternary compound by treatment with organic or inorganic acids or alkyl esters thereof.

It will be appreciated that the nature of the radical R' in the sulphonic acid chlorides having the general Formula III is not of primary importance as the said radical R' will not be present in the desired end product having the general Formula I above.

Sulphonylation of primary alcohols by means of inorganic or organic tertiary bases as condensation agent usually gives rise to the corresponding sulphonic acid ester. However, there is little or no information available as regards the behaviour of α,β-unsaturated primary alcohols on sulphonylation.

Presumably due to the high reactivity of allyl alcohol groups, in addition to the normal sulphonic acid esters, we have found that products are obtained which are produced by subsequent further reactions. For example, where the sulphonylation is effected with p-toluene-sulphochloride in pyridine at 0-20° (the preferred method of the process of the present invention) elymoclavine does not give the expected normal O-tosyl ester but there is obtained unexpectedly the pyridinium tosylate having the general Formula IV ($R'=CH_3C_6H_4$) which has occurred by the reaction of the pyridine with the tosyl ester; said pyridinium tosylate is soluble in ethanol and water, amorphous and hygroscopic. Sulphonylation effected in otherwise analogous manner but using mesyl chloride (=methane sulphonyl chloride) and nasyl chloride (=β-napthalene sulphonyl chloride) gives the pyridinium salts of the mesylate and nasylate which correspond to the tosylate and which are non-crystalline.

The pyridinium sulphonates of the present invention may be converted into any other required salts by using an ionic exchange agent, for example, Amberlite IRA 410; examples of such other salts are the chloride, bromide, perchlorate, sulphate and hydroxyl, of which the non-crystalline pyridinium bromide gives a crystalline methobromide with methyl bromide. Similarly the corresponding tertiary ammonium base with picric acid gives the crystalline bis-picrate.

Partial hydrogenation of the pyridinium tosylate which may be effected, for example, in glacial acetic acid or ethanol with a palladium black catalyst at room temperature and ambient pressure, gives the 6-methyl-8-piperidino-methyl-ergolene(8) with a yield of 40-50% after 3 mol equivalents of hydrogen have been taken up.

Instead of using the tosylate it is possible toeffect the hydrogenation in a similar manner using other pyridinium salts, for example the chloride, bromide or sulphate, whereby the pyridinomethyl compounds are formed with a similar yield.

It is possible to convert the compounds into water-soluble bis-ammonium salts which are crystalline, by treatment with alkyl halides, e.g. methyl bromide or methyl iodide.

By the action of strong bases, for example potassium hydroxide in methanol or sodium butylate in n-butanol, at 120-140° on the 6-methyl-ergolene-(8) derivatives of the general Formula I the double bond in the 8,9-position is shifted in conjugation to the indole ring system, whereby there are obtained two compounds which are epimers at $C_8$ which may be separated by chromatography on aluminium oxide, i.e. the derivatives of 6-methyl-ergolene(9) and 6-methyl-isoergolene(9). The classification of the epimers as regards the stated configuration is based upon a comparison of the manner of their adsorption on aluminium oxide, their melting points, and their optical rotations with the corresponding data of closely resembling lysergic acid derivatives which have a known configuration.

The exemplified compounds I and their salts have pharmacodynamic useful properties which may be made use of in therapy; further characteristic features are their noticeable sedative, narcosis potentiating and analgetic effects.

A test of the analgetic effect of 6-methyl-8-piperidinomethyl-ergolene(9) (substance I), -isoergolene-(9)- (substance II) and -ergolene(8) (substance III) during the warm plate test with mice gives the following average prolongation to the reaction time 30–60 minutes after subcutaneous intake:

| Substance | Prolongation of reaction time, percent | | | $ED_{50}$ Narcosis potentiation, mg./kg. |
|---|---|---|---|---|
| | 1.0 mg./kg. | 3.0 mg./kg. | 10.0 mg./kg. | |
| I | 24 | 57 | 61 | 2.1 |
| II | | 28 | 47 | 3.0 |
| III | 19 | 30 | 49 | 1.7 |

In order to test the effect of narcosis potentiation the $ED_{50}$ is determined with mice 30 minutes after injecting them subcutaneously ($ED_{50}$=effective dosage in mg./kg. after intake of a dosage which produces with half the animals tested narcosis of at least 3 minutes by administration of thiopental in an amount just insufficient by itself to produce narcosis). As may be seen from the above table the substances are very effective.

It is noteworthy that, although a large number of natural and synthetic ergolene derivatives are already known, only the exemplified compounds of the invention have analgetic and narcosis potentiating properties. The derivatives of the above Formula I are intended for use in therapy.

In the following examples which illustrate the process of the invention but do not limit its scope in any way, all temperatures are stated in degrees centigrade. Melting and boiling points are uncorrected. The various process steps mentioned above are illustrated in the said examples according to the following table:

| Step | Example |
|---|---|
| Production of the pyridinium sulphonate IV | 1, 2, 3 |
| Exchange of the sulphonate ion for another anion | 4 |
| Hydrogenation to give the ergolene-(8) derivative V | 5 |
| Conversion into the bis-ammonium salts | 6, 7 |
| Isomerisation to give the ergolene(9)/isoergolene(9) derivative | 8 |

*Example 1.—D-6-methyl-8-pyridiniummethyl-ergolene(8)-tosylate*

850 mg. of p-toluene sulphochloride (4.4 millimol) are added to a solution of 1.02 g. of elymoclavine (4 millimol) in 24 cc. of pyridine while cooling and stirring. After approximately 15 minutes the initially clear solution becomes turbid. The temperature is then allowed to rise to 25° whereby a dark viscous oily mass sticking to the container separates out gradually. After vigorous stirring for 3 hours the precipitated product is brought into solution by adding 5 cc. of water, the resulting solution is made alkaline by the addition of a saturated potassium carbonate solution, the resulting material is extracted with a mixture of chloroform and isopropanol (3:1). After washing the organic extracts with a saturated sodium chloride solution and drying over sodium sulphate, the solvent is driven off in a vacuum and a solution of the resulting residue in the minimum amount of methanol possible is mixed with chloroform until clouding sets in. The resulting material is then brought onto a column of 75 mg. of aluminium oxide suspended in chloroform and chromatography is effected. Unchanged elymoclavine is eluted by means of chloroform containing 2% of methanol. Elution by means of chloroform containing 5% of methanol of D-6-methyl-8-pyridiniummethyl-ergolene(8)-tosylate is then effected; this last mentioned material is obtained as a hygroscopic, almost colourless foam which is soluble in water, methanol and ethanol, but which cannot be crystallized.

U.V. spectrum: maxima at 218, 284 and 294 mμ (in ethanol).

*Example 2.—D-6-methyl-8-pyridiniummethyl-ergolene-(8)-mesylate*

0.4 cc. of methane sulphochloride are added to a solution of 1 g. of elymoclavine in 20 cc. of pyridine while cooling and the resulting mixture is stirred for 3 hours at room temperature. After decomposition of the excess methane sulphochloride with water, further working-up is effected as in Example 1. The resulting D-6-methyl-8-pyridiniummethyl-ergolene(8)-mesylate is obtained as a hygroscopic foam which is soluble in ethanol and water, and is almost colourless. $[\alpha]_D = -81°$ (c.=0.4 in methanol).

U.V. spectrum: maxima at 214, 266, 283 and 294 mm.

*Example 3.—D-6-methyl-8-pyridiniummethyl-ergolene-(8)-nasylate*

1.2 g. of β-naphthalene sulphochloride is reacted with 1 g. of elymoclavine in 20 cc. of pyridine using the method of Example 1. The resulting D-6-methyl-8-pyridiniummethyl-ergolene(8)-nasylate is obtained in the form of a hygroscopic foam which cannot be crystallized. $[\alpha]_D = -63°$ (c.=0.3 in ethanol).

*Example 4.—D-6-methyl-8-pyridiniummethyl-ergolene-(8)-chloride hydrochloride*

1 g. of D-6-methyl-8-pyridiniummethyl-ergolene(9)-tosylate in 10 cc. of water is filtered through a column of 5 g. of Amberlite IRA 410, said column having previously been treated with hydrochloric acid and washed neutral with water; the filtrate, after acidification with 2-N hydrochloric acid is evaporated to dryness in a vacuum. The resulting residue cannot be crystallized from water, methanol or ethanol. D-6-methyl-8-pyridiniummethyl-ergolene(8)-chloride hydrochloride, after decolourizing with activated charcoal and evaporating the filtrate, forms a hygroscopic powder which is almost colourless.

*Example 5.—D-6-methyl-8-piperidinomethyl-ergolene(8)*

1.5 g. of palladium black in 25 cc. of ethanol are hydrogenated and thereafter a solution of 4.0 g. of D-6-methyl-8-pyridiniummethyl-ergolene(8)-tosylate (approximately 8 millimol) in 25 cc. of ethanol is added. After 600 cc. of hydrogen (24 millimol) have been taken up, the hydrogenation is stopped and the catalyst is filtered off. The filtrate is evaporated to dryness in a vacuum, a solution of the resulting residue in chloroform is extracted with sodium bicarbonate solution in water, the resulting material is dried over sodium sulphate and evaporated in a vacuum. The resulting residue is dissolved in benzene, placed on a column of 75 g. of aluminum oxide and chromatography is effected. The first two fractions of a benzene eluate enable the isolation of D-6,8-dimethyl-ergolene(I) as a byproduct which melts after recrystallization from acetone and methanol at 242–243°.

Subsequent fractions of the benzene eluate contain D-6-methyl-8-piperidinomethyl-ergolene(8) which melts after repeatedly recrystallizing it from acetone at 169–170°. The material can be sublimed at 160° in a high vacuum.

Keller's colour reaction: blue.
Concentrated sulphuric acid: yellow.
U.V. spectrum: maxima at 226, 284 and 294 mμ.

Example 6.—D-6-methyl-8-piperidinomethyl-ergolene(8)-bis-methobromide

A solution of 250 mg. of D-6-methyl-8-piperidinomethyl-ergolene(8) in 10 cc. of methanol and 4 cc. of methylbromide is melted into an ampoule and heated for 1 hour at 170°. Thereupon the reaction solution is evaporated to dryness in a vacuum. The bis-methobromide crystallizes on rubbing with ethanol in the form of colourless felted needles. After recrystallization from methanol-ethanol the required material has a melting point of 188–189° (decomposition). $[\alpha]_D = -53°$ (c.=0.4 in water).

Example 7.—D-6-methyl-8-piperidinomethyl-ergolene(8)-bis-metho-iodide

A solution of 200 mg. of D-6-methyl-piperidinomethyl-ergolene(8) in 5 cc. of ethanol is mixed with 3 cc. of methyl-iodide and boiled at reflux for one hour. The bis-metho-iodide commences to crystallize at an elevated temperature in the form of colourless needles. After recrystallization from a mixture of water-ethanol the bis-metho-iodide melts at 186–187° (decomposition). $[\alpha] = -31°$ (c.=0.3 in water).

Example 8.—D-6-methyl-8-piperidinomethyl-ergolene(9) and D-6-methyl-8-piperidinomethyl-isoergolene(9)

A solution of 740 mg. of D-6-methyl-8-piperidinomethyl-ergolene(8) in 30 cc. of methanol and 5 g. of potassium hydroxide are molten in a bomb calorimeter and the material is heated to 135° for 1½ hours while shaking occasionally. The reaction product is dissolved in benzene, placed on a column of 30 g. of aluminium oxide and chromatography is effected. The benzene eluate of the fractions 1–3 (each of 25 cc.) yields after recrystallization from acetone D-6-methyl-8-piperidinomethyl-isoergolene(9) which melts at 154–156° from acetone. $[\alpha]_D^{20} = +173°$ (c.=0.25 in pyridine).

U.V. spectrum: maxima at 227, 243 and 315 mμ (in ethanol).

The fractions 4–6 of the benzene eluate (each of 25 cc.) consist of mixtures of both isomers whereas the subsequent eluates (again of 25 cc. each) contain D-6-methyl-8-piperidinomethyl-ergolene(9) having a melting point of 185–187°. By repeated recrystallizations from acetone the last mentioned product is purified, it being obtained in the form of prismatic crystals having a melting point of 201–202°. $[\alpha]_D^{20} = +48°$ (c.=0.4 in pyridine).

Having thus disclosed the invention, what is claimed is:

1. A member selected from the group consisting of the basically substituted ergolene derivatives having the Formula I

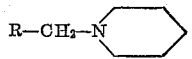

wherein R is a radical selected from the group consisting of 6 - methyl - ergolene(8)yl(8), 6 - methyl - ergolene(9)yl(8), and 6-methyl-isoergolene(9)yl(8), their non-toxic addition salts with pharmaceutically acceptable acids, and their tosylates, mesylates, nasylates, chlorides, metho-bromides and metho-iodides.

2. D - 6 - methyl - 8 - pyridiniummethyl - ergolene(8)-tosylate.
3. D - 6 - methyl - 8 - pyridiniummethyl - ergolene(8)-mesylate.
4. D - 6 - methyl - 8 - pyridiniummethyl - ergolene(8)-nasylate.
5. D - 6 - methyl - 8 - pyridiniummethyl - ergolene(8)-chloride hydrochloride.
6. D - 6 - methyl - 8 - piperidinomethyl - ergolene(8)-bis-metho-bromide.
7. D - 6 - methyl - 8 - piperidinomethyl - ergolene(8)-bis-metho-iodide.
8. D-6-methyl-8-piperidinomethyl-ergolene(9).
9. D-6-methyl-8-piperidinomethyl-isoergolene(9).
10. D-6-methyl-8-piperidinomethyl-ergolene(8).

References Cited in the file of this patent

UNITED STATES PATENTS

| | | |
|---|---|---|
| 2,700,040 | Ullyot | Jan. 18, 1955 |
| 2,784,199 | Grogan et al. | Mar. 5, 1957 |

FOREIGN PATENTS

| | | |
|---|---|---|
| 674,061 | Great Britain | June 18, 1952 |

UNITED STATES PATENT OFFICE
CERTIFICATION OF CORRECTION

Patent No. 3,014,909            December 26, 1961

Jürg Rutschmann et al.

It is hereby certified that error appears in the above numbered patent requiring correction and that the said Letters Patent should read as corrected below.

Column 1, lines 40 to 50, the formula should appear as shown below instead of as in the patent:

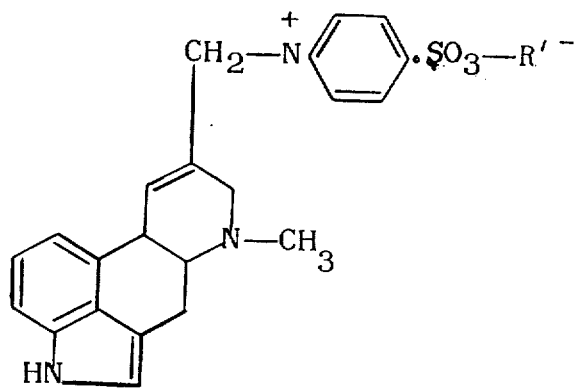

Signed and sealed this 9th day of October 1962.

(SEAL)
Attest:

ERNEST W. SWIDER            DAVID L. LADD
Attesting Officer              Commissioner of Patents